United States Patent Office 3,531,808
Patented Oct. 6, 1970

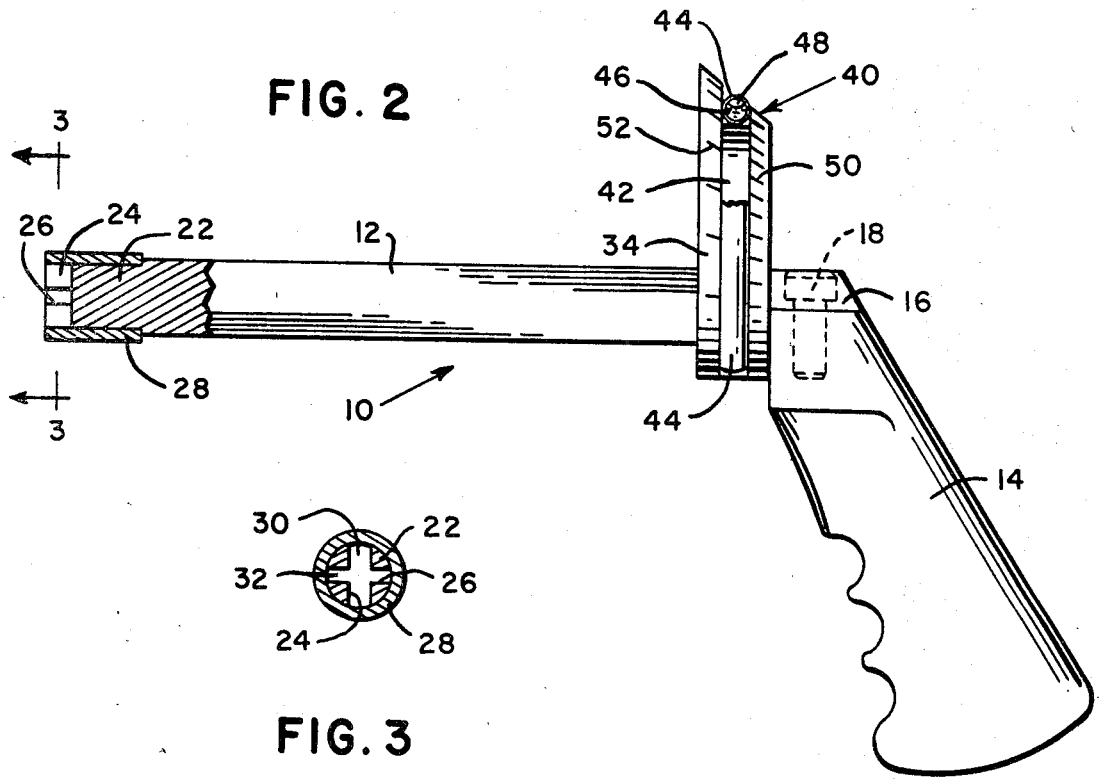
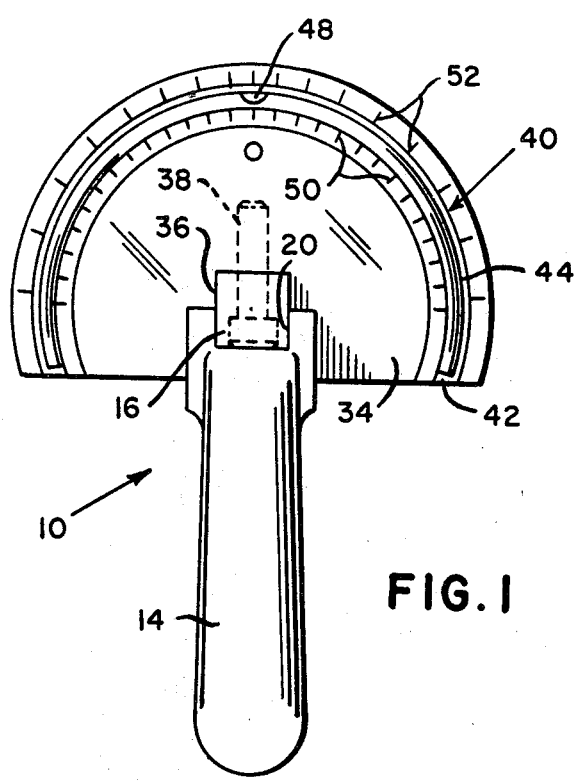

3,531,808
SELF-INDICATING ADJUSTING TOOL
Harry R. McCue, San Diego, Calif., assignor to The Bullard Company, Bridgeport, Conn., a corporation of Connecticut
Filed Mar. 14, 1968, Ser. No. 713,105
Int. Cl. B25f 1/00; B25b 23/00
U.S. Cl. 7—1
6 Claims

ABSTRACT OF THE DISCLOSURE

A wrench for a rotatably adjustable member having a horizontally disposed axis of rotation, the wrench including integrally mounted means for indicating incremental movements of the adjustable member consisting of a circular spirit level and a coacting scale mounted on the shank of the wrench. The markings on the scale may be calibrated to indicate units of rotation of the directly rotated member or units of movement of any other member operatively associated therewith.

---

The present invention relates to a hand tool for adjustably moving a rotatable member and has particular reference to such a tool which includes an integrally mounted spirit level device capable of accurately indicating predetermined increments of adjustment of the rotatable member.

Devices of various types are commonly provided with a member which may be rotatably moved to adjustably position the member or another member operatively associated therewith. One example of such a device is the Tool Block disclosed in U.S. Pat. 3,296,904, granted Jan. 10, 1967, to Edward P. Bullard III, wherein rotatable eccentric members are employed to provide precise longitudinal and transverse adjustments, within limits, of a cutting tool tip, e.g., in making an initial setup of the cutting tool, to correct for wear of the tool, to allow for deflection encountered during a machining operation, etc. In such instances, it is generally necessary or desirable to provide a reliable indication of the amount of adjustment being made. As exemplified by the tool block disclosed in the aforementioned patent, this has heretofore been often achieved by mounting a calibrated scale and a pointer on fixed and rotatable members, respectively, of a device in a manner such that the scale and pointer cooperatively indicate units of movement of the rotatable member or some other member operatively associated therewith, as the rotatable member is adjustably moved. Other variations of the scale and pointer combination are well known, as well as is the use of dial indicators mounted on a device in a manner to be operated by the relative movement between an adjustable member and its fixed mounting with the dial scale being calibrated in any suitable manner to indicate increments of movement of a selected member. While movement indicating apparatus of the type described are widely employed, they generally require the mounting of the various elements directly to adjustable and fixed members of the device on which they are used. However, the structural requirements of many such devices do not leave sufficient space for mounting the necessary elements thereon, so that the use of movement indicating apparatus of the type described may be effectively precluded.

Accordingly, an object of the present invention is to provide an adjustment tool for a rotatably adjustable member which is capable of accurately and reliably indicating the extent of movement of the adjustable member. Other objects include the provision of such a tool which dispenses with the necessity for mounting any of the movement indicating elements on the adjustable member or its support; in which the movement indicating elements are integrally mounted on the tool itself; which can be calibrated to indicate units of movement of an adjustable member or any other member operatively associated therewith; and which can be provided with a plurality of calibrated scales applicable to a corresponding number of different adjustable members for which the same adjustment tool may be employed.

The above objects are accomplished in the present invention by mounting a circular shaped spirit level on a plate which is integrally connected to an adjusting wrench. The center of curvature of the spirit level coincides with the axis of rotation of the adjustable member-engaging portion of the wrench. Scale markings provided on the plate adjacent the spirit level coact with a small air bubble in the spirit level to reliably and accurately indicate increments of rotary movement of the wrench. The markings may be calibrated to indicate increments of rotation of the adjustable member, or the rotary or linear movement of a separate member operatively associated therewith.

Numerous other objects and advantages of the invention will be apparent as it is better understood from the following description which, taken in connection with the accompanying drawings, discloses a preferred embodiment thereof.

Referring to the drawings:

FIGS. 1 and 2 are front and side elevational views, respectively, of an adjusting wrench embodying the features of the present invention; and FIG. 3 is a sectional view taken substantially along line 3—3 of FIG. 2.

As a preferred or examplary embodiment of the instant invention, FIGS. 1 and 2 show a wrench generally designated 10 having a shank 12 with a handle 14 secured to one end 16 thereof by a bolt 18. The end 16 of the shank 12 is preferably provided with a rectangular cross section and closely fits within a mating rectangular channel 20 formed in the handle 14 to securely key the handle to the shank.

The free end 22 of the shank 12 is suitably formed to provide a means for engaging a member to be rotatably adjusted. In the exemplary embodiment shown in FIGS. 2 and 3, the end 22 is a shank portion of circular cross section having two diametrically extending slots 24 and 26 of different widths disposed at right angles to each other. An annular sleeve 28 dimensioned to produce a force-fit is mounted on the shank end 22 so as to encircle the slots 24 and 26 and thereby form wrench openings 30 and 32, respectively, having different widths and adapted to engage correspondingly dimensioned different rotatably ajustable members. It will be apparent that with the wrench described, a user will have no difficulty in positioning a particular wrench opening on its corresponding adjustable member by virtue of the close fit which should result when the wrench is properly positioned.

A plate 34 having a rectangular shaped slot 36, dimensioned for close mating engagement with the shank end 16, is secured to the shank end 16 by a bolt 38. The outer surface 40 of the plate 34 is frusto-conical in shape and disposed concentrically with, and preferably inclined at an angle of approximately 30° to, the centerline of the shank end 22, with the lesser diameter of the surface 40 being positioned adjacent the handle 14. The surface 40 is provided with a circularly extending slot 42 within which is fixedly mounted a closed-ended circularly formed tube 44, the slot being so dimensioned that the outer surface of the tube extends slightly above the surface 40. The tube 44 is formed from a transparent material and contains a quantity of suitable liquid 46. The liquid 46 fills the tube 44 except for a small air bubble 48, thereby forming a circular spirit level in which the air bubble always seeks a location at the extreme upwardly positioned portion of the tube as indicated in FIGS. 1 and 2.

The surface 40 is provided with scale markings 50 and 52 adjacent each side of the slot 42 which cooperate with the air bubble 48 to indicate incremental movements as the wrench 10 is rotated. Notwithstanding the fact that the bubble 48 has a finite circumferential width, it has been found that as the tool 10 is rotatably moved during an adjustment operation, the change in position of the bubble can be readily noted with a very high degree of precision and repeatability. The inclination of the surface 40 and the resultant positioning of the bubble 48 relative to the scale markings 50, 52 facilitate precise readings of changes in position of the bubble, it being understood that the eyes of the operator will preferably be approximately on a level with the horizontal axis of the wrench as it is being used.

Each scale 50, 52 may be suitably calibrated to coact with the bubble 48 to indicate incremental movements of an adjustable member or another member operatively connected to the adjustable member. In one application, scale 50 may be calibrated in even degree increments to indicate rotary movements of an adjustable member adapted to be engaged by the wrench opening 30, and scale 52 may be calibrated in uneven degree increments in a manner to indicate units of linear movement of an element operatively associated with an adjustable member adapted to be engaged by the wrench opening 32. In a modified form of the invention, the shank and plate may each be adapted to interchangeably mount a number of wrench members and corresponding scales respectively for thereby employing the same basic tool for a variety of separate different adjusting tasks.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

What is claimed is:

1. A tool with a self-carried indicator for precisely adjusting a member having a horizontally disposed axis of rotation comprising a shank having a manually engageable handle at one end thereof and means for engaging a member to be rotatably adjusted at the other end thereof, a plate mounted on said shank having a surface of revolution the centerline of which coincides with the centerline of said engaging means, a transparent closed-ended tube mounted on said surface concentric with the centerline of said engaging means, and indicia markings on said surface adjacent said tube, said tube being substantially filled with a liquid with an air bubble therein for coacting with said markings to indicate predetermined amounts of rotational movement of said engaging means.

2. The adjusting tool set forth in claim 1 wherein said indicia markings have an equal angular spacing for indicating equal increments of angular rotation of said member.

3. The adjusting tool set forth in claim 1 wherein said rotatably adjustable member is an eccentric adapted to linearly move an adjustable element as said eccentric is rotated, and said indicia markings have a predetermined unequal angular spacing for indicating equal increments of linear movement of said element.

4. The adjusting tool set forth in claim 1 wherein said surface of revolution is a frusto-conical surface with the lesser diameter thereof disposed adjacent said handle.

5. The adjusting tool set forth in claim 4 wherein said tube is disposed in an annular slot formed in said plate adjacent said surface, and the outermost surface of said tube is disposed slightly outwardly from said frusto-conical surface.

6. The adjusting tool set forth in claim 5 wherein said engaging means includes means for engaging separate adjustable members, and said surface is provided with indicia markings on the separate sides of said slot, each of said indicia markings being calibrated to indicate movement of one of the adjustable members.

References Cited

UNITED STATES PATENTS

| | | | |
|---|---|---|---|
| 922,080 | 5/1909 | Bowers. | |
| 2,469,795 | 5/1949 | Sproul. | |
| 2,601,643 | 6/1952 | Sulger | 33—207 |
| 2,637,229 | 5/1953 | Lee | 81—3 |
| 3,296,904 | 1/1967 | Bullard | 82—36 |

ROBERT C. RIORDON, Primary Examiner

R. V. PARKER, Jr., Assistant Examiner

U.S. Cl. X.R.

33—207; 81—121